Figure 1:
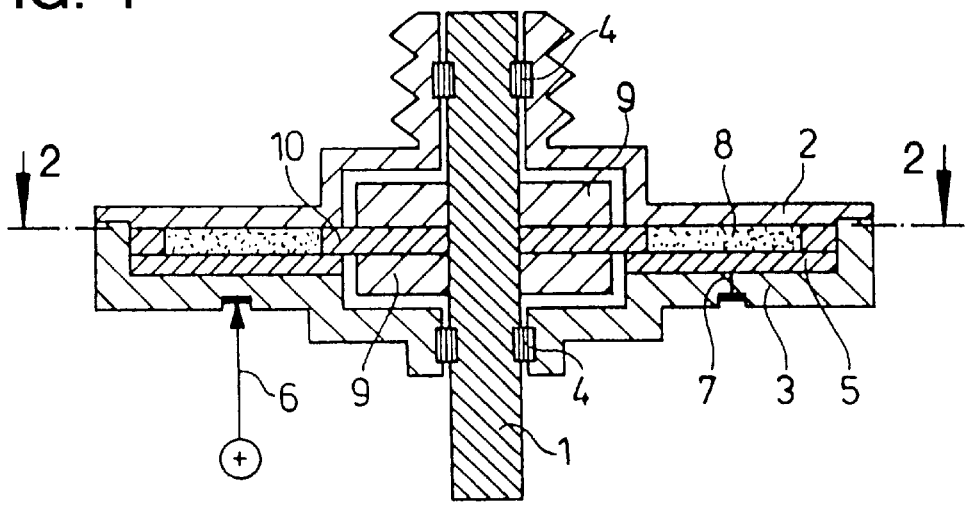

United States Patent [19]
Wendt et al.

[11] Patent Number: 5,988,336
[45] Date of Patent: Nov. 23, 1999

[54] CLUTCH WITH ELECTRORHEOLOGICAL OR MAGNETORHEOLOGICAL LIQUID PUSHED THROUGH AN ELECTRODE OR MAGNET GAP BY MEANS OF A SURFACE ACTING AS A PISTON

[75] Inventors: Eckhardt Wendt, Leverkusen; Andreas Pohl, Gross-Umstadt; Horst Rosenfeldt, Grosszimmern, all of Germany

[73] Assignees: Bayer Aktiengesellschaft, Leverkusen; Carl Schenck AG, Darmstadt, both of Germany

[21] Appl. No.: 09/134,553

[22] Filed: Aug. 14, 1998

[30] Foreign Application Priority Data

Aug. 19, 1997 [DE] Germany .............. 197 35 897

[51] Int. Cl.⁶ ..................................................... F16D 35/00
[52] U.S. Cl. .................... 192/21.5; 192/58.4; 188/267.1; 188/267.2
[58] Field of Search ................. 192/21.5, 58.4; 188/267.1, 267.2

[56] References Cited

U.S. PATENT DOCUMENTS

| | | | |
|---|---|---|---|
| 2,695,675 | 11/1954 | Frye | 188/267.2 X |
| 4,444,298 | 4/1984 | Stangroom | 192/21 X |
| 4,668,417 | 5/1987 | Goossens et al. | 252/75 |
| 4,702,855 | 10/1987 | Goossens et al. | 252/75 |
| 4,782,927 | 11/1988 | Sproston et al. | 192/21.5 |
| 4,896,754 | 1/1990 | Carlson et al. | 188/267.1 X |
| 4,898,084 | 2/1990 | Oppermann et al. | 73/118.1 |
| 5,268,118 | 12/1993 | Bloodworth et al. | 252/73 |
| 5,462,687 | 10/1995 | Podszun et al. | 252/79 |
| 5,496,483 | 3/1996 | Herrmann et al. | 252/73 |
| 5,503,763 | 4/1996 | Podszun et al. | 252/73 |
| 5,524,743 | 6/1996 | Bullough et al. | 192/21.5 |
| 5,598,908 | 2/1997 | York et al. | 192/21.5 |

OTHER PUBLICATIONS

D.P. Colvin, et al., Control of a Fall–Safe Tether Using an ER–Fluid Brake *Proceedings of the 2nd International Conference on Electrorheological Fluids*, (1989) pp. 426–436.

A. Hosseini–Sianaki, et al., "The High Speed Electrorheological Catch–Characteristics, Dimensional Considerations and Non Linear Operational Aspects" (Jun. 24–26, 1992) *Actuator 92 Conference Proceedings, 3rd International Conference on New Actuators* pp. 118–122, plus Copyright page, 2 title pages.

*Primary Examiner*—Charles A Marmor
*Assistant Examiner*—Ankur Parekh
*Attorney, Agent, or Firm*—Sprung Kramer Schaefer & Briscoe

[57] ABSTRACT

This invention relates to a controllable clutch based on electrorheological or magnetorheological liquids, in which the transmission of force or the transmission of torque is achieved in that an electrorheological or magnetorheological liquid is pushed through an electrode gap or magnet gap of the clutch by means of a surface acting as a piston.

5 Claims, 5 Drawing Sheets

CLUTCH WITH ELECTRORHEOLOGICAL OR MAGNETORHEOLOGICAL LIQUID PUSHED THROUGH AN ELECTRODE OR MAGNET GAP BY MEANS OF A SURFACE ACTING AS A PISTON

This invention relates to a controllable clutch based on electrorheological or magnetorheological liquids, in which the transmission of force or the transmission of torque is achieved in that an electrorheological or magnetorheological liquid is pushed through an electrode gap or magnet gap of the clutch by means of a surface acting as a piston.

Clutches based on electrorheological liquids are known in principle. The known clutches based on electrorheological liquids offer the advantage that the transmittable torque can be continuously controlled via an electric field. These liquids change their apparent viscosity due to the effect of the electric field. The prior art on clutches of this type comprises plate clutches and barrel rotor clutches, which are described in the "ACTUATOR 92 Conference Proceedings", 3rd International Conference on New Actuators, pages 118 to 122, Bullough, or in the "Proceedings of the 2nd International Conference on Electrorheological Fluids" 1989, pages 426 to 435, Carlson, for example.

In the first case a barrel rotor clutch (a cylinder system) is described, and in the second case a multi-plate clutch is described, each of which comprises an electrorheological liquid for controlling the clutch. A common feature of both clutches is that the electrorheological liquid is sheared between faces which are moving in relation to each other.

A mode of operation such as this is usually described in the literature as "shear mode".

The construction of clutches of this type comprises considerable shortcomings which have their basis in the structure of electrorheological liquids. Since liquids which can be used industrially usually comprise dispersions of particles in carrier media and the particles have a higher density than that of the carrier media, high speeds of rotation in clutches and brakes result in considerable centrifugal acceleration and thus in the segregation of the particles and the carrier liquid. The shearing effect of the faces which are moving in relation to each other is insufficient to effect complete re-dispersion of the particles. The effect described above, namely the continuous control of the apparent viscosity via a field, is then in principle severely restricted, and is possibly completely eliminated.

For electrorheological liquids, further difficulties arise when clutches such as these are operated by means of DC voltage, due to the electrophoresis of the ERL particles. The latter is understood to be the migration of particles in an electric field in the direction of a pole. In principle, the consequences are the same as those of centrifugal acceleration.

The term "clutch" is usually employed when an accelerating torque is to be transmitted. If a decelerating torque is to be transmitted, the term "brake" is employed. The clutches according to the invention can also be used as a brake.

The present invention overcomes the aforementioned disadvantages of the known clutches by the use of the electrorheological liquid or magnetorheological liquid in flow mode. In this mode, the liquid is pushed through an electrode gap or magnet gap by means of a surface which acts as a piston.

This results in a permanent re-dispersion of the particles in the carrier liquid. The function of the electrorheological liquid or magnetorheological liquid is thereby ensured.

Moreover, in the case of electrorheological liquids the particular advantage arises that liquids exhibit a higher electrorheological activity in flow mode than in shear mode. Accordingly, it is also possible according to the invention to transmit a higher torque without this drastically impairing the properties of the electrorheological or magnetorheological liquid over extended periods of operation.

The present invention relates to a clutch based on electrorheological or magnetorheological liquids, containing a substantially rotationally symmetrical housing with a shaft rotatably mounted in the housing, wherein the housing comprises at least one axially symmetrical chamber in the shape of a disc or in the shape of an annular gap, means for generating an electric or magnetic field between the boundary faces, which are in the shape of a disc or in the shape of a cylindrical curved surface, of each of the chambers, wherein the chambers are filled with an electrorheological or magnetorheological liquid, with the characterising feature that means comprising electrically insulating or non-magnetic material are provided for subdividing the chambers into at least two sectors, wherein at least one of the boundary faces, which are in the shape of a disc or in the shape of a cylindrical curved surface, is fixedly attached to one of the elements comprising the housing and shaft, and the means for subdividing the chambers into sectors are fixedly attached to the other of the elements comprising the housing and shaft.

Clutch elements based on electrorheological liquids are operated via electrical voltages, due to which the capacitors contained in the clutch elements generate electric fields for controlling the rheological quantities comprising the flow limit and modulus of the electrorheological liquids.

Electrorheological liquids are understood to be dispersions of finely divided electrically polarisable hydrophilic particles in hydrophobic, electrically highly insulating oils (generally a suspension of electrically polarisable, non-conducting particles), the flow limit of which, or the shear modulus or modulus of rigidity of which, changes rapidly and reversibly, and which under some circumstances changes by several orders of magnitude, under the effect of an electric field of sufficiently high field strength. The ERL thus changes from a fluid state of aggregation, via a plastic state of aggregation, almost to a solid state of aggregation.

Examples of suitable electrorheological liquids are cited in German Offenlegungsschriften DE 35 17 281 A1, DE 35 36 934 A1, DE 39 41 232 A1, DE 40 26 881 A1, DE 41 31 142 A1 and DE 41 19 670 A1.

Both DC voltage electric fields and AC voltage electric fields are used to excite electrorheological liquids. The electrical power required in this respect is very low.

A sensor, such as that described in German Offenlegungsschrift DE 36 09 861 A1 for example, can be used for controlling the flow behavior of the electrorheological liquid in the clutch elements.

Magnetorheological liquids (MRLs) are understood to be suspensions of finely divided magnetic particles with a particle size from a few nm to a few $\mu$m in suitable liquids such as mineral oils or silicone oils, wherein the solids content of the suspension is typically about 20 to 60% by volume. Magnetorheological liquids change their resistance to flow under the effect of a strong magnetic field depending on the magnetic field strength. Depending on the type of magnetorheological liquid, they reach shearing stress values of up to 100 kPa.

The transmission of force between the elements denoted as the shaft and the housing is effected via the friction of the liquid in the disc-shaped or cylindrical chamber. It can be controlled via the variation of the electric or magnetic field strength which prevails in the chamber. In known clutches of this type, shearing forces generated in the liquid are responsible for the transmission of force. Due to the subdivision of the chamber according to the invention into at least two sectors, for example by a spoked wheel which is disposed between the boundary faces of the chambers and which is fixedly attached to one of the elements comprising the housing or shaft for example, the liquid in the sectors is entrained, so that the front face of the spoke acts as a piston on the liquid in relation to the relative direction of rotation of the spokes of the spoked wheel.

Both boundary faces of the at least one chamber are preferably attached to the housing and the means for the sectoral subdivision of the chambers are preferably fixedly attached to the shaft. These means are preferably constructed as spoked discs. The spoked discs may comprise two or more spokes. Too many spokes would mask the active face of the chamber too strongly, however. Therefore, not more than six spokes should be provided according to the invention.

According to a further preferred embodiment of the invention, the transmission of force is effected both by thrust forces and by shearing forces. For this purpose, one of the boundary faces of the disc-shaped or cylindrical chamber is fixedly attached to the housing and the other boundary face of the chamber is attached to the shaft, so that the relative rotational movement between the shaft and the housing generates shearing forces in the liquid, and the means for the sectoral subdivision of the chambers are fixedly attached to one of the boundary faces, for example in the form of stays which are radially disposed on the boundary face in the case of a disc-shaped chamber or as stays parallel to the axis in the case of a cylindrical chamber.

For a clutch according to the invention which is based on an electrorheological liquid, the disc-shaped or cylindrical boundary faces of the chambers consist of electrically conductive material, are electrically insulated from each other and can be connected to the terminals of a source of high voltage. The electrically insulating components of a clutch such as this may consist of ceramic, glass or of high-impact, dimensionally stable plastics such as polypropylene sulphide or polycarbonate or other industrial polymers, which may optionally contain reinforcing fillers or glass fibers.

In the case of a clutch based on magnetorheological liquids, the boundary faces of the chambers consist of magnetisable material, preferably a soft ferromagnetic material. Magnetisation is effected by means of a magnetising coil.

The invention is described in more detail below with reference to the accompanying Figures.

Figure 2:
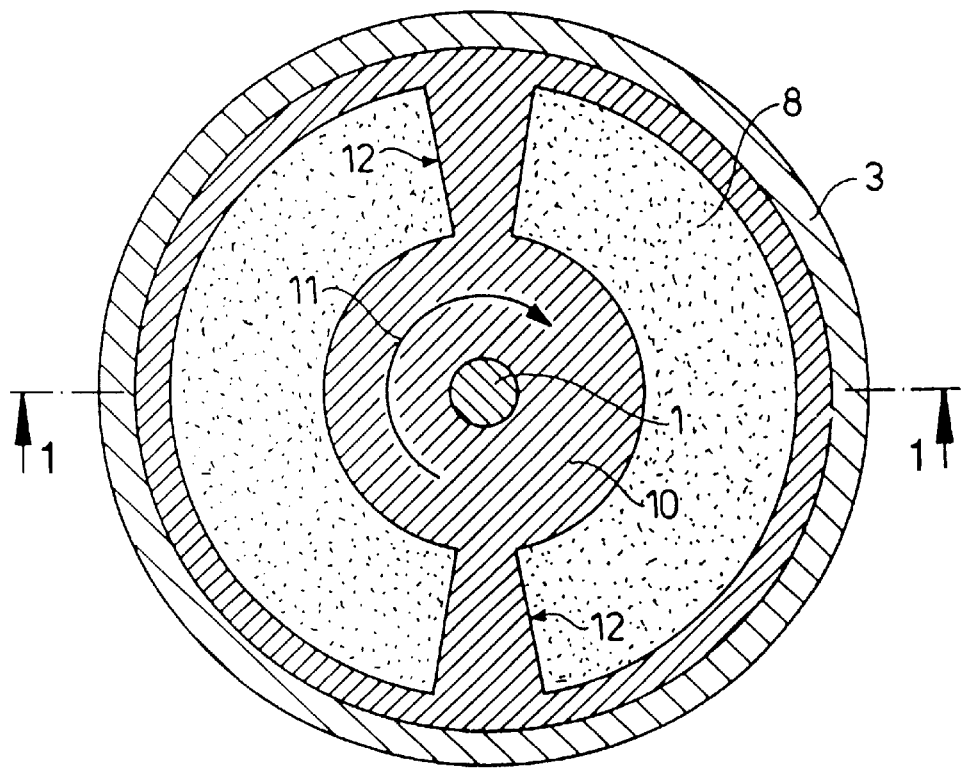
Figure 3:
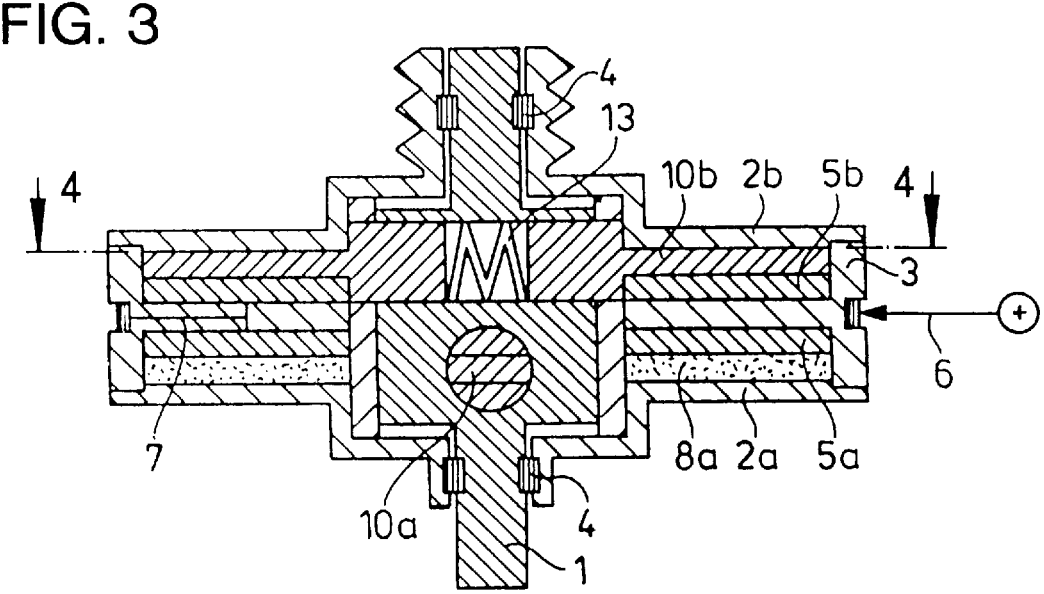
Figure 4:
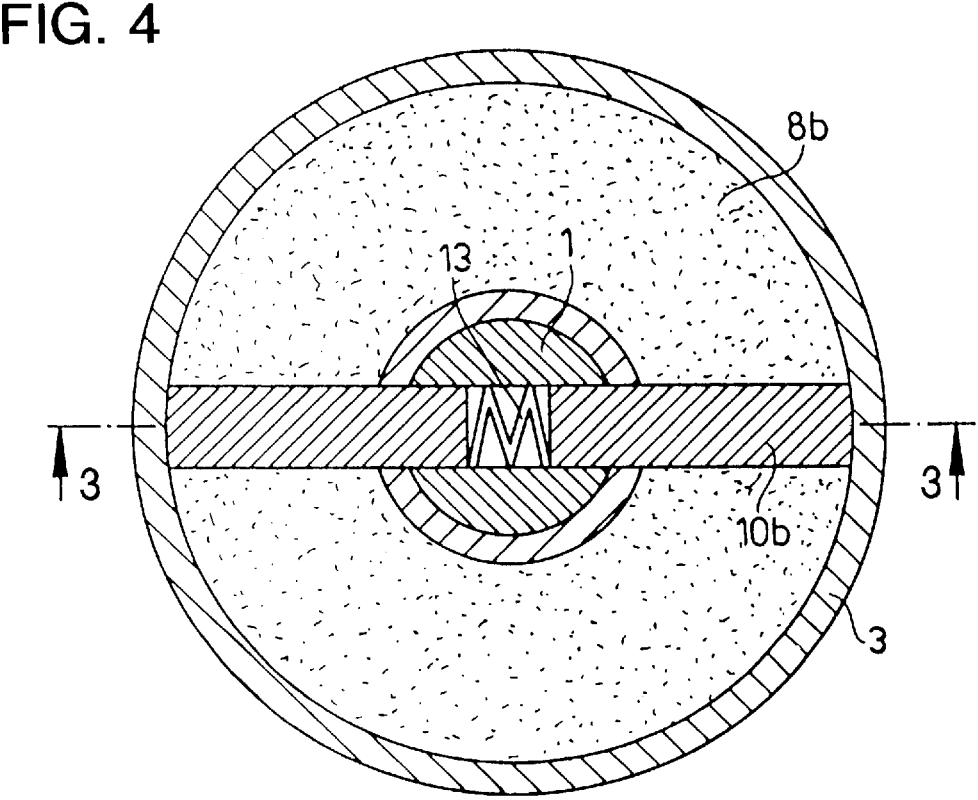
Figure 5:
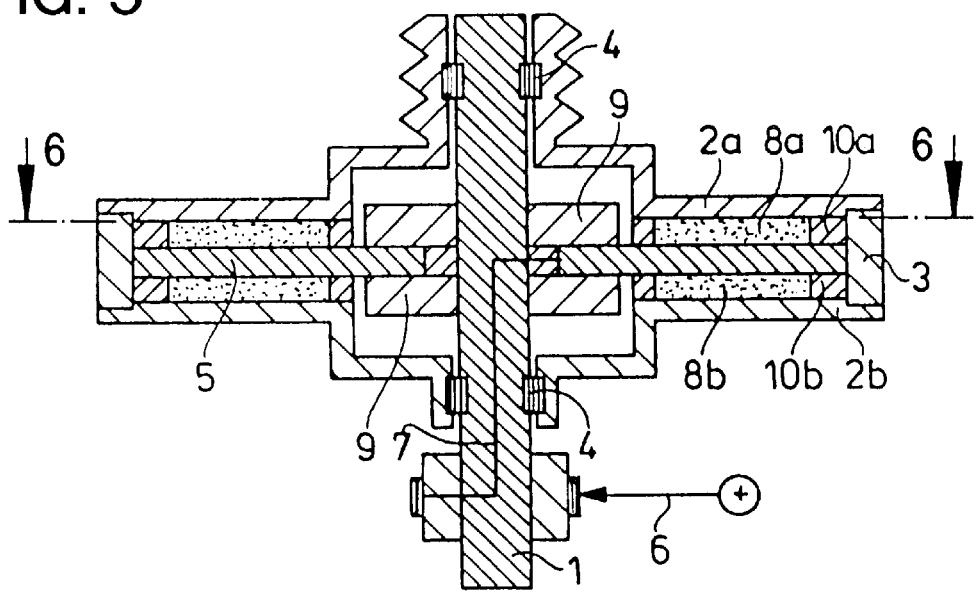
Figure 6:
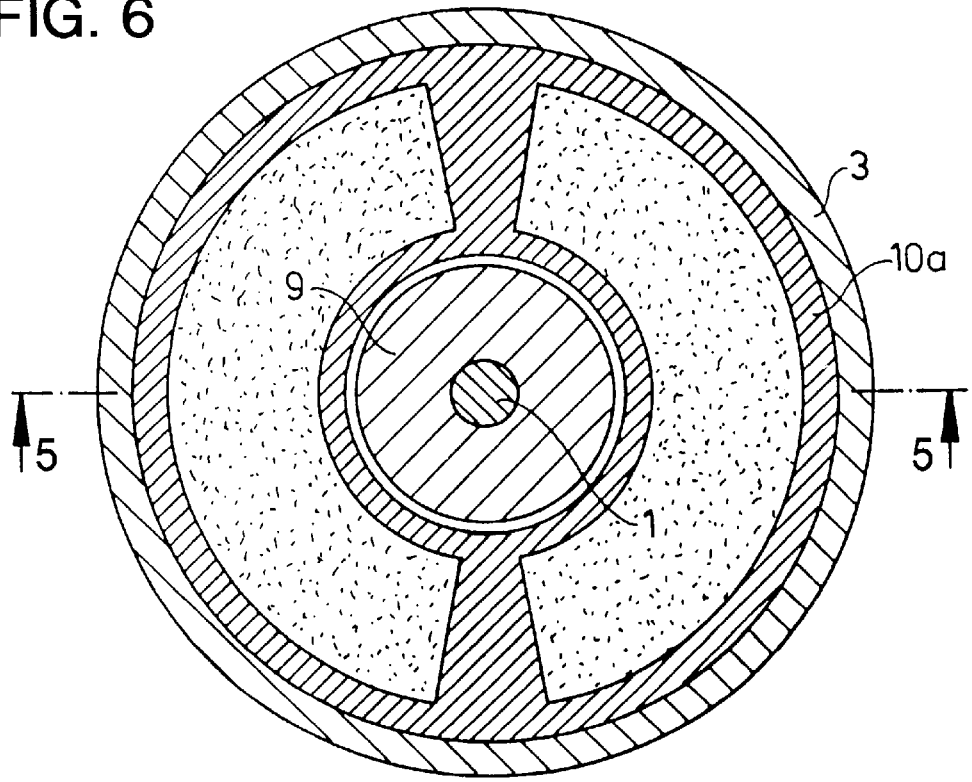
Figure 7:
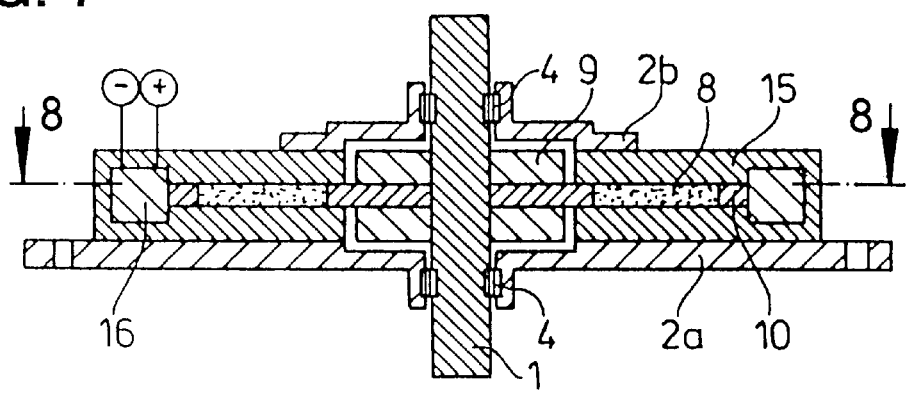
Figure 8:
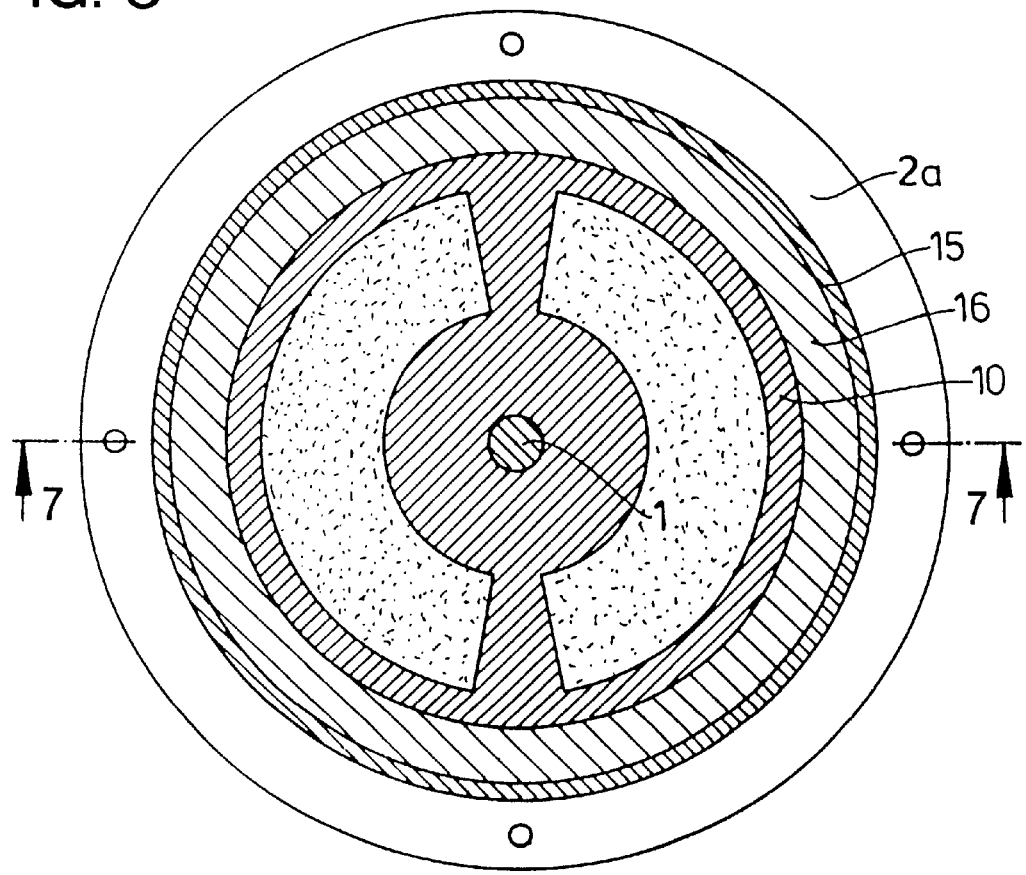
Figure 10:
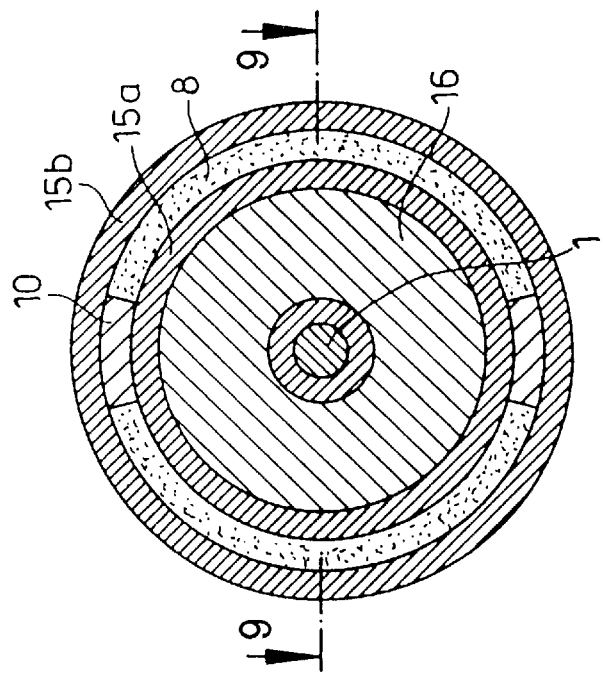
Figure 9:
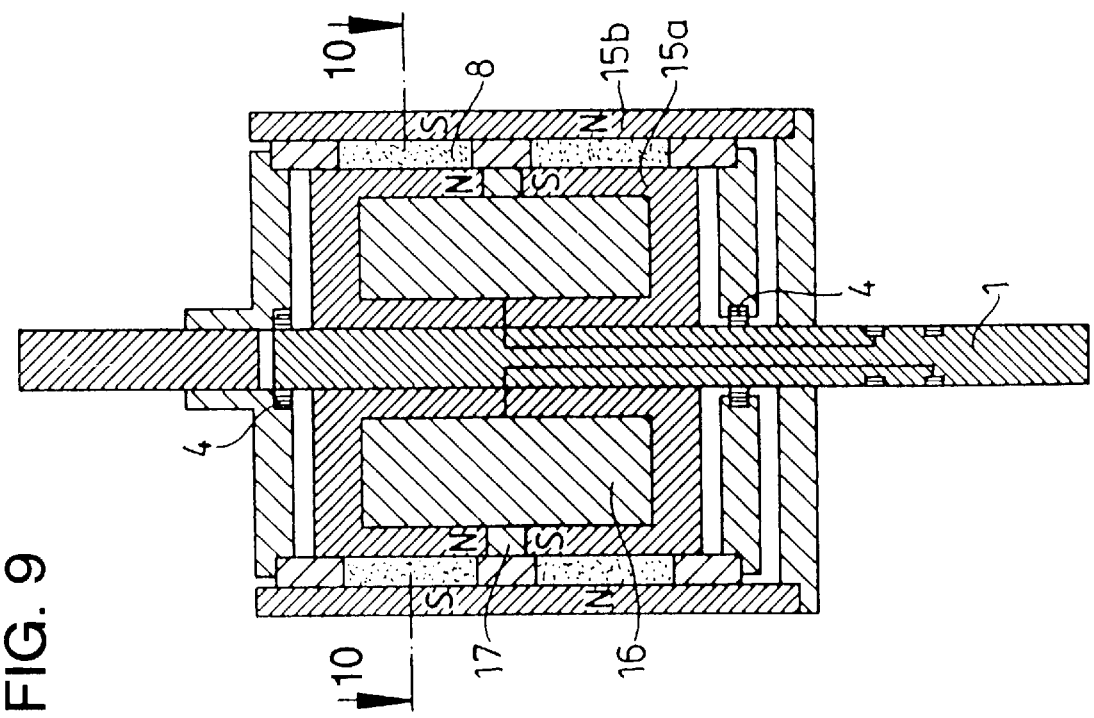

FIGS. 1 and 2 comprise a longitudinal (a) and a transverse section (b) through a first electrorheological clutch according to the invention;

FIGS. 3 and 4 comprise a longitudinal and a transverse section through a second electrorheological clutch which has two chambers;

FIGS. 5 and 6 comprise a longitudinal and a transverse section through a second electrorheological clutch according to the invention which has two chambers, wherein the transmission of force is effected by shearing and thrust forces;

FIGS. 7 and 8 show a longitudinal and a transverse section through a first magnetorheological clutch according to the invention; and FIGS. 9 and 10 show a longitudinal and a transverse section through a second embodiment of a magnetorheological clutch, wherein the chamber is constructed in the form of an annular gap.

Identical reference numerals in the Figures denote analogous elements in each case.

The electrorheological clutch shown in FIGS. 1 and 2 contains a driven or drivable shaft 1, and also contains a housing consisting of two parts, in which the shaft 1 can rotate via rolling bearings 4. Housing part 3, which consists of insulating material, has a disc-shaped electrode 5 on its inside. This electrode can be connected, via a sliding contact 6 and a connecting lead 7 which is led through the housing 3, to a source of high voltage. Housing part 2, which consists of conductive material, is earthed. Together with the high-voltage electrode 5, housing part 2 forms the disc-shaped chamber 8 which is filled with an electrorheological liquid. The spoked disc 10, which is made of insulating material, is fixedly attached to the shaft 1 by means of clamps 9.

If the housing 2, 3 is driven in rotation, in the direction of arrow 11 for example, a pressure is exerted on the faces of the spokes 12 which are at the back in the direction of rotation, due to the frictional forces which the lateral boundary faces of the disc-shaped chamber 8 exert on the electrorheological liquid. This pressure sets the spoked disc 10 and the shaft 1 fixedly attached thereto in rotation. By applying an electric field, typically a high voltage in the region of a few kilovolts, the viscosity of the electrorheological liquid is increased, so that the pressure on the spokes is also increased. In the clutch shown in FIGS. 3 and 4, which consists of two chambers, the housing consists of two parts 2a and 2b made of conductive material and a third part 3 made of insulating material. Instead of the spoked disc, spokes 10 are provided which are inserted in shaft 1, which is enlarged within the radius of the housing, and these spokes are pressed in sliding contact against housing part 3 via spring elements 13. Spokes 10a and 10b in chambers 8a and 8b are offset by 90° in relation to each other. In the electrorheological double-chamber clutch shown in FIGS. 5 and 6, the high-voltage electrode 5 is fixedly attached to the shaft 1 via clamps 9 made of insulating material. The spoked discs 10a and 10b are fixedly attached to housing parts 2a and 2b, respectively. The magnetorheological clutch shown in FIGS. 7 and 8 comprises a coil 16 with a magnetic armature 15, the poles of which form the boundary faces of the disc-shaped chamber 8. The circuit of the magnetic flux through the armature is closed via the magnetorheological liquid situated in chamber 8. In this case the spoked disc 10 which is fixedly attached to the shaft 1 may consist of a non-magnetisable metal, for example aluminium.

The magnetorheological clutch shown in FIGS. 9 and 10 comprises an annular gap 5 for receiving the magnetorheological liquid. The magnetising coil 16 with its magnetisable core 15a is situated inside the annular gap 5. The magnetic flux through the core 15a is interrupted by a ring made of non-magnetisable material 17. The circuit of the flux is closed via the magnetorheological liquid situated in the annular gap 8 and via the external casing 15b made of magnetisable material.

We claim:

1. A clutch based on electrorheological or magnetorheological liquids, containing a substantially rotationally symmetrical housing with a shaft rotatably mounted in the housing, wherein the housing comprises at least one axially symmetrical chamber in the shape of a disc or in the shape of an annular gap, means for generating an electric or magnetic field between boundary faces, which are in the shape of a disc or in the shape of a cylindrical curved surface, of said at least one chamber, wherein said at least one chamber is filled with an electrorheological or magnetorheological liquid, with the characterizing feature that means made of electrically insulating or non-magnetic material are provided for subdividing said at least one chamber into at least two sectors, wherein at least one of said boundary faces is fixedly attached to one of said housing or said shaft, and the means for subdividing said at least one chamber into sectors is fixedly attached to the other of said housing or said shaft.

2. A clutch according to claim 1, wherein both boundary faces of the at least one chamber are attached to the housing and the means for the sectoral subdivision of the chambers are constructed in the form of spoked discs which are fixedly attached to the shaft.

3. A clutch according to claim 1, wherein one of the boundary faces of the at least one chamber is attached to the housing, the other boundary face is fixedly attached to the shaft, and the means for the sectoral subdivision of the chambers are attached to one of the boundary faces.

4. A clutch based on electrorheological liquids according to claim 1, wherein the boundary faces are electrically insulated from each other and can be connected to the terminals of a source of high voltage.

5. A clutch based on magnetorheological liquids according to claim 1, wherein the boundary faces of the chambers consist of ferromagnetic material and can be magnetised by a magnetising coil.

* * * * *